US011688108B2

(12) United States Patent
Deguy et al.

(10) Patent No.: US 11,688,108 B2
(45) Date of Patent: *Jun. 27, 2023

(54) GENERATING PROCEDURAL TEXTURES WITH THE AID OF PARTICLES

(71) Applicant: Adobe Inc., San Jose, CA (US)

(72) Inventors: Sebastien Deguy, Clermont-Ferrand (FR); Christophe Soum, Clermont-Ferrand (FR); Cyrille Damez, Clermont-Ferrand (FR); Eric Batut, Clermont-Ferrand (FR)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,725

(22) Filed: Oct. 13, 2021

(65) Prior Publication Data
US 2022/0108498 A1 Apr. 7, 2022

Related U.S. Application Data

(63) Continuation of application No. 14/905,545, filed as application No. PCT/IB2014/001327 on Jul. 15, 2014, now Pat. No. 11,176,714.

(30) Foreign Application Priority Data

Jul. 18, 2013 (FR) ..................................... 13/01709

(51) Int. Cl.
G06T 11/00 (2006.01)
G06T 15/04 (2011.01)
(Continued)

(52) U.S. Cl.
CPC .............. *G06T 11/001* (2013.01); *G06T 7/49* (2017.01); *G06T 13/80* (2013.01); *G06T 15/04* (2013.01);
(Continued)

(58) Field of Classification Search
CPC . G06T 11/001; G06T 7/49; G06T 2219/2012; G06F 17/5009
See application file for complete search history.

(56) References Cited

U.S. PATENT DOCUMENTS 6,996,509 B2 * 2/2006 Strumolo ................ B05B 12/00
703/2
7,557,807 B2 * 7/2009 Chen ........................ G06F 30/20
345/473

(Continued)

FOREIGN PATENT DOCUMENTS

FR 3008814 A1 1/2015
JP 2005-128687 A 5/2005
(Continued)

OTHER PUBLICATIONS

Office Action as received in Canadian Application 2,917,383 dated Feb. 23, 2022.
(Continued)

*Primary Examiner* — Samantha (Yuehan) Wang
(74) *Attorney, Agent, or Firm* — Keller Preece PLLC

(57) ABSTRACT

System and Method for generating textures on an object on the basis of the particles emitted by a particles engine, including: an access to data of a particles emitter, of particles emitted, of target object, of traces, and of graphical effects; an animation simulation module provided so as to perform a simulation of emission and of displacement for each of the particles provided; a tracer module provided for generating a trace on the surface of a target object corresponding to the displacement of a particle along said surface after an impact of the particle against the target object with the aid of the traces data and of the target object data; and a physical parameters integrator module provided for generating a new set of textures for said object taking into account the date of
(Continued)

the object, the data of each new or modified trace, and the data of the corresponding graphical effects.

20 Claims, 4 Drawing Sheets

(51) Int. Cl.
*G06T 7/49* (2017.01)
*G06T 13/80* (2011.01)

(52) U.S. Cl.
CPC ...... *G06T 2210/21* (2013.01); *G06T 2210/56* (2013.01)

(56) References Cited

U.S. PATENT DOCUMENTS

| | | | | |
|---|---|---|---|---|
| 8,099,265 | B2* | 1/2012 | Houston | G01P 5/001 703/2 |
| 8,319,771 | B2* | 11/2012 | Williams | G06T 17/00 345/589 |
| 8,915,740 | B2 | 12/2014 | Zboray et al. | |
| 11,176,714 | B2* | 11/2021 | Deguy | G06T 13/80 |
| 2011/0183304 | A1 | 7/2011 | Wallace et al. | |
| 2012/0086718 | A1* | 4/2012 | Schreiber | G06T 15/00 345/473 |
| 2014/0083049 | A1* | 3/2014 | Ruggie | B29C 33/00 264/293 |
| 2014/0267189 | A1* | 9/2014 | Moll | G06F 3/0393 345/179 |

FOREIGN PATENT DOCUMENTS

| | | |
|---|---|---|
| JP | 2009-291396 A | 12/2009 |
| WO | WO 2012-137060 A1 | 10/2012 |
| WO | WO 2015/008135 A1 | 1/2015 |

OTHER PUBLICATIONS

International Search Report dated Nov. 10, 2014, for International Patent Application No. PCT/IB2014/001327.
Examination Report as received in European Application 14 767 078.0 dated Jun. 19, 2019.
Office Action as received in Japanese Application 2016-526718 dated Jul. 10, 2018.
Decision to Grant as received in Japanese Application JP 2016-526718 A, dated Jan. 17, 2019.
Merillou et al., "A survey of aging and weathering phenomena in computer graphics", Computers and Graphics, Elsevier, GB, vol. 32, No. 2, Apr. 1, 2008, pp. 159-174.
Watson et al., "Procedural Uban Modeling in Practice", IEEE Computer Graphics and Applications, IEEE Service Center, New York, NY, vol. 28, No. 3, May 1, 2008.
Office Action as received in Canadian Application 2,917,383 dated May 7, 2021.
U.S. Appl. No. 14/905,545, May 18, 2017, Office Action.
U.S. Appl. No. 14/905,545, Jan. 24, 2018, Office Action.
U.S. Appl. No. 14/905,545, Oct. 23, 2018, Office Action.
U.S. Appl. No. 14/905,545, May 13, 2019, Office Action.
U.S. Appl. No. 14/905,545, Jan. 8, 2020, Office Action.
U.S. Appl. No. 14/905,545, May 22, 2020, Notice of Allowance.
U.S. Appl. No. 14/905,545, Sep. 9, 2020, Office Action.
U.S. Appl. No. 14/905,545, Nov. 25, 2020, Office Action.
U.S. Appl. No. 14/905,545, Mar. 11, 2021, Office Action.
U.S. Appl. No. 14/905,545, Jul. 12, 2021, Notice of Allowance.
Summons to Oral Proceedings as received in European Application 14 767 078.0 dated Apr. 24, 2023.

* cited by examiner

GENERATING PROCEDURAL TEXTURES WITH THE AID OF PARTICLES

CROSS-REFERENCE TO RELATED APPLICATIONS

This application is a continuation of U.S. patent application Ser. No. 14/905,545, filed on Apr. 25, 2016, which is a National Stage Entry into the United States Patent Trademark Office from International PCT Patent Application No. PCT/IB2014/001327, having an international filing date of Jul. 15, 2014, and which claims priority to French Patent Application No. 13/01709, filed Jul. 18, 2013. Each of the aforementioned applications is hereby incorporated by reference in its entirety.

FIELD OF THE INVENTION

The present invention relates to a system and a method for generating textures on an object using particles projected onto an object.

DESCRIPTION OF THE RELATED ART

In the field of computer graphics a myriad of tools have been used for many years to apply colors to objects. Conventionally, a color is applied as a layer, in the manner of a layer of paint applied to an actual physical substrate.

The application of a layer of color typically produces a uniform result. To obtain variations in color, intensity or opacity, a user must manually adjust the color settings at each point, thereby creating an accurate and detailed color mapping. Various graphical tools such as virtual brushes and applicators are made available to the user who performs such a "mapping".

To change a previously established "mapping", the user employs the same types of tools in order to apply the changed parameters point by point, and thus to generate a modified colorimetric result. Even though the user can use a frame to select multiple points to be changed in a similar fashion, the process must be carried out manually for each image, and therefore requires a considerable amount of time.

Different filters are also known, which may be applied to one or more colors of an image. Conventionally, such filters act to change the colors based on parameters that are intrinsic to the colors themselves. These filters therefore allow effects to be created based on either the chosen environment or style imposed by a user or according to the original parameters of the colors to be processed.

Thus, the process of creating or modifying object colors does not allow the parameters or characteristics of the objects on which the color is applied, nor the environment in which the objects are arranged in the scene, to be taken into account. Thus, to create realistic effects, a user must proceed manually in order to determine the target points or areas, the parameters to be modified, and the level of modification of the selected parameters. If one or more objects from a scene or scenes are to be processed, considerable time may be needed to carry out the required operations.

For example, for the coloring of an area of wooden material in order to impart it with a realistic wooden appearance, a user must perform the parametric adjustments in a meticulous and accurate manner As the coloring tools do not take material properties or interactions between objects and their environment into account, a user wishing to create a visual effect based on a material's reaction or behavior must firstly envision or imagine the desired effect in a realistic manner, and then apply the color changes in accordance with the settings of the existing colors. Thus, if a color is applied to an object, its coloring impact will be the same on all areas of the object. For example, if the object has a metallic portion, a different wooden portion, and a plastic area, the applied color has the same effect on all of these areas, whereas on a real object, the effects produced on each of the materials will vary, or even be very different, depending on the circumstances.

FR2681967 discloses a method for modifying the colors of an image displayed on a display device based on the determination of colorimetric values. The method includes selecting at least one color indicative of at least one pixel in the image comprised of a plurality of pixels, determining the colorimetric values of said at least one color, selecting a second color and determining the colorimetric values of the second color, and modifying the colorimetric values of a plurality of pixels in the image so that for any given pixel of said plurality having colorimetric values which correspond to the colorimetric values of said at least one color, the colorimetric values of the given pixel are modified so that they correspond to the colorimetric values of the second color. The applied color is identical, whatever the nature of the object (plastic, wood, etc.) and does not take textures into account, but only color variations in an area selected by the user.

EP0884694 discloses a method for adjusting colors in digital images, including correcting "red eyes" in photographs. The pixel color data are adjusted by identifying the pixels in a digital image comprising original color data corresponding to the predetermined color. However, the color is applied automatically, based on colorimetric data only, in particular the colors of the iris.

WO2008066880 discloses a method for obtaining an original set of two or more original colors associated with an item of artwork. For that purpose, an input set of one or more user-selected colors is received. For each original color, the original color is mapped onto the derived colors. The plurality of derived colors is obtained based on one or more user-selected colors.

WO2012154258 discloses a three-dimensional colorimetric coloring tool. Each pixel in the image comprises a set of pixel values in a three-dimensional color space. Even though the applied color allows a wide range of colors to be used, it does not vary depending on the material on which it is applied.

U.S. Pat. No. 7,557,807 discloses a computer-implemented method which comprises generating an object having certain characteristics and emitting a particle. The path of the particle is checked to determine whether it will interact with the object. In the case of a collision between the particle and the object, the characteristics of the object are modified, in particular to simulate the ageing and erosion behaviors of the object. The described method involves implementing pointwise mapping of the object. A y-ton map is then applied to each point.

There is therefore a need to overcome these various disadvantages.

SUMMARY OF THE INVENTION

An object of the invention is to provide a system and method for improving the efficiency and productivity of graphic design tools.

Another object is to provide a system and graphical method for increasing the flexibility and graphics capabilities when generating colors or renditions.

Another object of the invention is to provide a system and graphical method for increasing the realism of the represented items.

Yet another object of the invention is to provide a system and method for improving the interactivity between the rendition of a represented object and its environment.

Yet another object of the invention is to provide a system and method for creating a contextual editing mode which takes environmental parameters into account.

To achieve this object, the invention provides various technical means. For example, the invention first provides a system for generating procedural textures on an object using the particles emitted by a particle engine, comprising:
- access to particle emitter data;
- access to emitted particle data;
- access to data relevant to target objects defined by architectural parameters and procedural textures;
- access to trace data;
- access to graphical effects data;
- a microprocessor and control instructions;
- an animation simulator module, adapted to perform emission and displacement simulation for each of the provided particles using the particle emitter data and emitted particle data;
- a tracer module for generating a parameterized trace which produces one or more physical and/or chemical changes in properties of at least the surface of said object, so as to modify at least one of its parameters, in particular a visible characteristic;
- a physical parameter integrator module for:

i) performing graphical effects based on the obtained object data and trace data;

ii) generating a new texture set for said object, taking into account the object data and the graphical effects previously obtained.

With such an arrangement, a system can take into account a parametric architecture in order to determine the influence of particles projected onto objects. This parametric architecture makes use of the physical and/or chemical elements inherent to the components and properties of the particles and objects. In particular, due to the fact that parameterized objects and their textures can be modified according to parameterized traces based on physical and/or chemical phenomena, a scene can be implemented and evolve in accordance with a much greater number of parameters than just the colorimetric parameters conventionally accounted for, thus dramatically increasing the realism of the visual effects produced.

According to an advantageous embodiment, the tracer module comprises a rule selection module and an implementation module for applying the rule in order to generate the resulting trace data.

According to another advantageous embodiment, the tracer module comprises a trace mixer submodule for modifying a trace on which a new active particle is brought into interaction.

Advantageously, the system further comprises a temporal storage module for keeping data allowing a texture set to be generated again for an object for which one or more parameters are modified, or to again obtain a texture set which had previously been generated.

Also advantageously, the system further comprises an input module for user data that may affect the data from the simulation module.

According to yet another embodiment, the system further comprises access to data relevant to global parameters that may influence a plurality of emitted particles and/or at least one object in the area of influence of these global parameters.

The invention also provides a method for generating procedural textures on an object using particles emitted by a particle emitter, comprising the following steps:
- an animation simulator module receives data from at least one particle emitter, data relevant to particles to be emitted by the emitter, data relevant to at least one target object, which is defined by architectural parameters and procedural textures, liable to be impacted by said emitted particles, and determines a trajectory for each of the particles to be emitted as a function of the emitter data and particle data;
- for each particle colliding with a target object, a tracer module generates data relevant to at least one trace on the surface of said object based on the object data and particle data;
- a physical parameter integrator module performs the graphical effects based on the object data and trace data;
- for each object having undergone at least one particle impact, the physical parameter integrator module generates a new set of textures, taking into account the object data and the previously obtained graphical effects.

In an alternative embodiment, the integrator module generates the textures of the new set by performing the graphical effects based on the object data and trace data.

According to another embodiment, for each active particle, a rule selection module selects a rule to be applied, and a rule implementation module evaluates said rule according to the target object parameters in order to generate the resulting trace data.

According to yet another alternative embodiment, for each trace modification rule a particle selection module selects particles affected by the rule to be applied, and a rule implementation module evaluates said rule according to the particle parameters and the target object in order to generate the resulting trace data.

DESCRIPTION OF THE DRAWINGS

Fully detailed embodiments are given in the following description, in conjunction with FIGS. 1 to 5, which are presented only for the purposes of non-limiting examples and in which.

In the following description, substantially identical or similar items will be designated by the same reference numerals.

DETAILED DESCRIPTION OF EMBODIMENT(S) OF THE INVENTION

By "physical parameter" is meant any physical and/or chemical item, property or characteristic capable of being measured or observed or detected or quantified, which characterizes an object, a particle, an environment, an emitter, etc.

By "parametric architecture" is meant the set of parameters that define the physical, chemical (components, properties, visual appearance of an object, texture, etc.) and behavioral characteristics of an item (ink, texture, object, etc.).

By physical "particle" (or parameterized particle) is meant the physical and/or chemical elementary unit in its state when the projection is performed (solid, liquid, gaseous or a mixture of these phases) which, when projected onto an object, generates a parameterized trace that produces one or more physical and/or chemical changes in properties at least on the surface of this object, in particular textures of that object, so as to modify at least one of its physical parameters or characteristics, in particular a visible characteristic.

By "particle emitter" is meant an item, in particular a virtual item, whether visible or not in a scene, for projecting one or more physically parameterized particles onto an object, which has also been physically parameterized, such as a gun, spray gun, spray, nozzle, emitter, projector (for photons, or light or heating particles, etc.) etc. A scene may comprise one or more emitters. An emitter's parameters preferably comprise its position in the scene, and the orientation and angle of emission or projection of the particles.

By "trace" (or parameterized trace) is meant a point or path (a set of points) on the surface of a target object generated by the movement of one or more parameterized particles on the object due to an impact or collision therewith.

By "graphical effect" is meant a description of the physical and/or chemical process, which determines how one or more traces generated on a target object affect this object's texture. By way of illustration, some examples of graphical effects are as follows:
- a trace of liquid applied to bare wood is absorbed by the wood. Alternatively, this causes the wood's hue to darken;
- a liquid applied to a varnish or plastic is not absorbed at all and produces a "bead of liquid" effect on the surface of the material;
- heat applied to a painted material causes the paint to peel and then burn depending on the temperature set by the user, and optionally cause combustion of the material on which the paint is applied if the latter is combustible;
- application of an acid to, or sandblasting of a glossy plastic material will gradually roughen it, thus making it less glossy and increasingly rougher.

By "procedural texture" is meant a texture defined using algorithms and/or mathematically, and displayed by a rendering engine which transforms the mathematical data into a conventional image format such as bitmap, for example.

Figure 1:
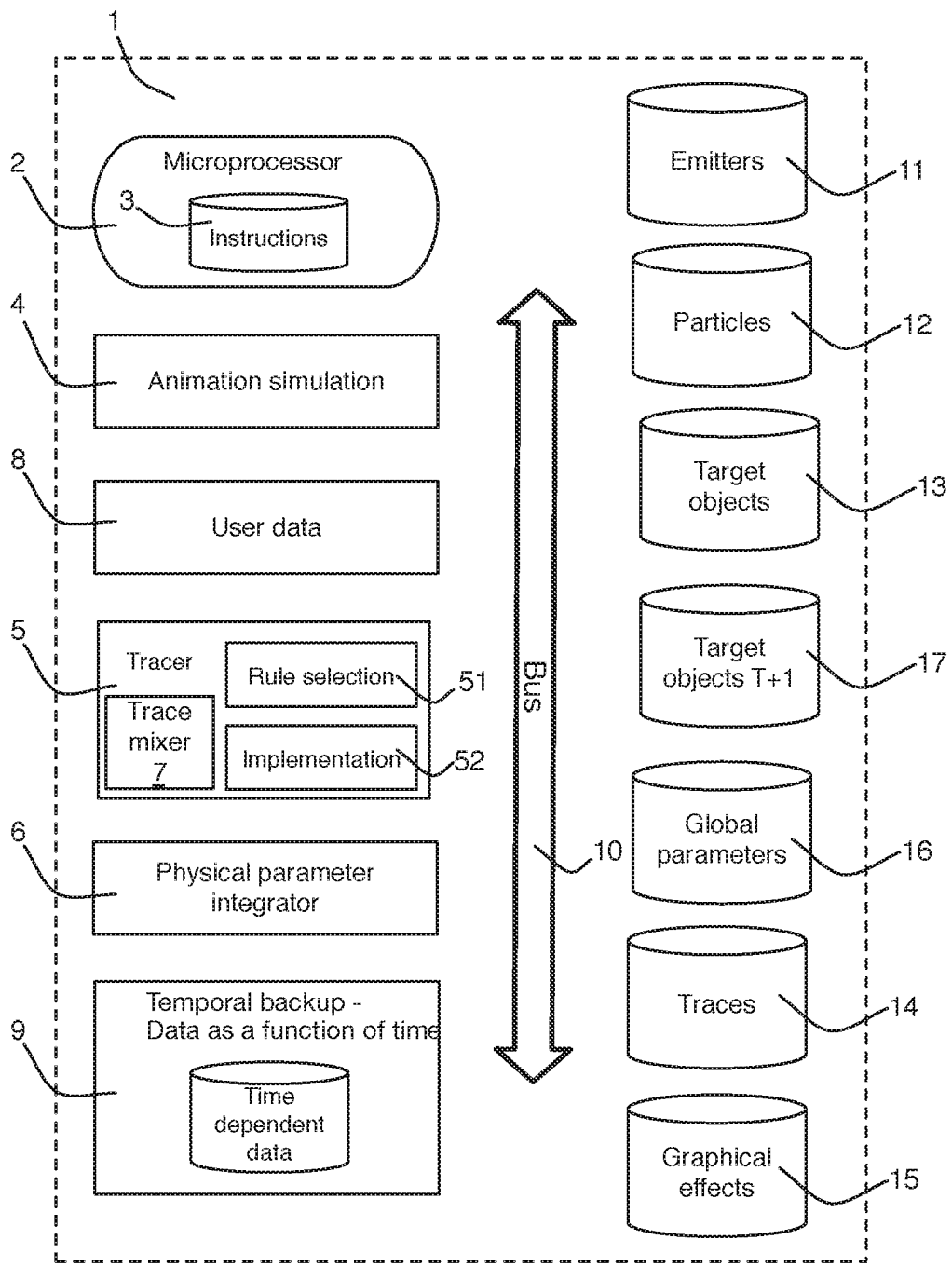
FIG. 1 schematically shows an example of a texture generator system according to the invention.

Through the method and system described in the following, the various stages of an evolutionary process can be determined and presented FIG. 1 illustrates an exemplary system for generating procedural textures according to the invention. The system comprises at least one microprocessor 2 suitable for the implementation of instructions in an instruction memory 3. A plurality of modules are advantageously provided through the implementation of the instructions by the microprocessor. An animation simulator module 4 allows the data related to the movement of various items in the scene to be obtained. This animation data further includes the spatial coordinates over time, events such as collisions, deactivations, etc., for each of the items.

A tracer module 5 can determine the particle motion data on a target object after the particle has collided with the object. A physical parameter integrator 6 makes it possible, using the physical parameters of interest, to generate a new set of textures for the object subjected to the various items and parameters.

A mixer module 7, which is optional, allows the data of several superimposed traces to be taken into account, when several traces include points or areas on common paths. The mixer can define, depending on the influence of each trace, a mixed or global trace portion. The latter will be used by the integrator in the relevant area. To illustrate the function of the trace mixer, the following non-limiting examples are provided:
- liquid traces which flow "down" and merge when they become too close;
- "crack" traces, which stop with only the widest remaining when they merge (cracks do not generally "intersect");
- impact traces that are completely independent of one another and do not "mix together".

A user input section 8 can receive data from an external source, such as, in particular from a user wishing to interact with the physical phenomena in progress or to come.

An optional backup module 9 allows temporal data to be kept, which are related to a time scale. For example, this module allows an animation simulation to be rerun after changing one or more parameters, by performing only those operations required by the changed data. It is thus possible to simply and quickly carry out several consecutive simulations based on a previous simulation, or to find a previously performed simulation.

A bus 10 is provided for data transfers among the various modules and memory elements described below.

An emitter memory element 11 contains data relevant to at least one particle emitter or engine. This data comprises, for example, the spatial coordinates and orientation of the emitter as a function of time, particle emission cone, emission rate, velocity and/or strength of emission, etc.

The emitted particle data is contained in a particle memory element 12. This data includes, for example, the physical characteristics of the particles such as shape, dimensions, weight, adhesion, elasticity, etc.

A target object data item 13 stores the data relevant to target objects that may be subject to impact during an animation simulation. This data includes, for example, the physical characteristics of the target objects such as shapes, dimensions, weights, and various characteristics related to the surface and textures of the objects.

A trace data element 14 stores the data traces generated by the particles on a given target object. The data may include a plurality of parameters such as width, depth and profile as a function of position along the trace, roughness, porosity, etc. Generally, any parameter that may influence the texture characteristics of the object in question can be taken into account. Indices can be assigned to each of the parameters in order to weight their relative significance levels.

A graphical effects data item 15 stores the data relevant to the graphical effects implemented in animation simulations. These graphical effects may include parameters for coloring, intensity, brightness, particle size, etc.

The above-described memory elements and/or the various modules can be combined into one or more components and one or more modules without significantly affecting the system's operation.

An optional item of global parameters 16 includes parameters that may affect several items in the scene, such as data related to temperature, pressure, humidity, physical force (magnetic, gravitational or the like), etc.

A target object texture data item 17 stores the data relevant to the new textures of target objects that may be subject to impact during an animation simulation. Any available original texture data can also be contained in this memory element 17.

Figure 2:
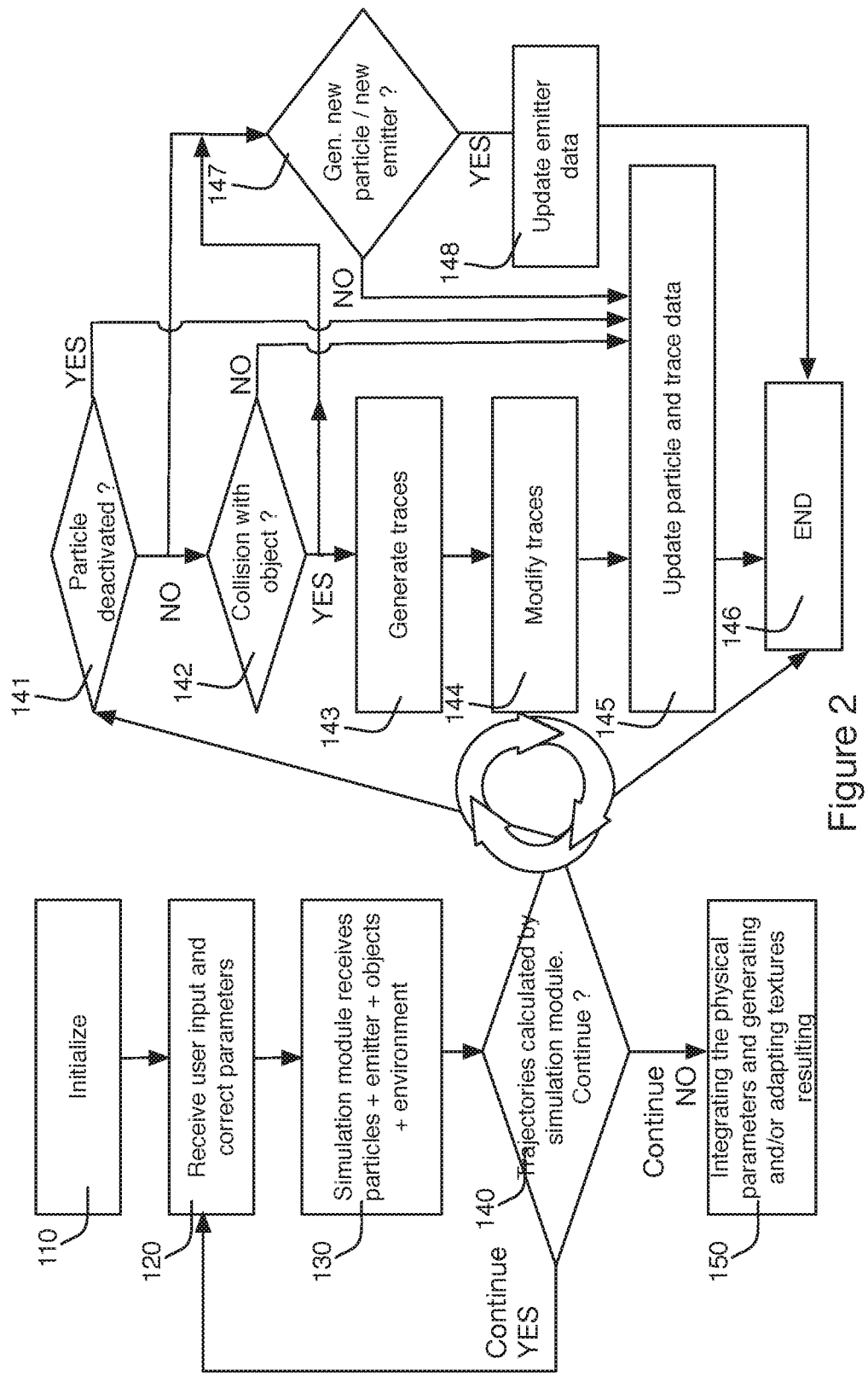
FIG. 2 is a block diagram showing the main steps of the texture generating method according to the invention.

FIG. 2 shows a flowchart of the main steps of the method for generating textures according to the invention. At step 110, the system and useful data are initialized. At step 120, which is optional, any available user data can be received to adjust or correct data or parameters to be processed by the animation simulator module 4 depending on a particular user need or desire.

Figure 3:
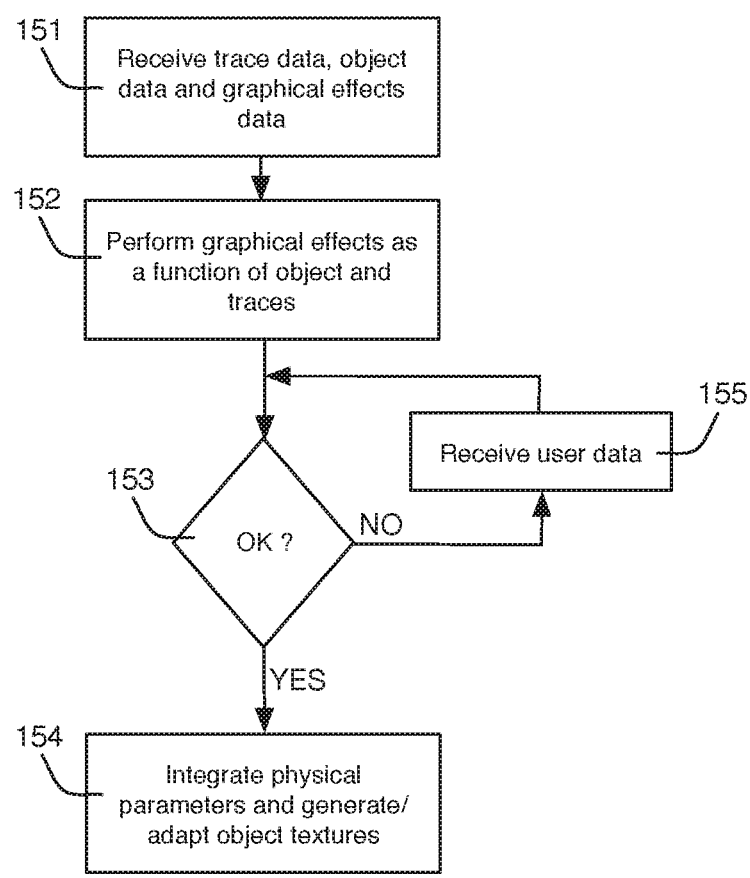
FIG. 3 is a block diagram showing in detail step 150 of FIG. 2.

Step 130, in the animation simulator module 4, includes receiving data related to particles, or emitters, the object or objects, and any environmental data. The animation simulator module 4 therefore receives all of the parameters which allow it to perform an animation of the scene. This animation simulation comprises a step of calculating trajectories of the items liable to move in the scene, such as the particles and any objects and/or emitters. Steps 141 to 148 show the different steps in this trajectory calculation phase in greater detail. After phase 140, phase 150 provides for the physical parameter integration and the generation and/or adaptation of a new set of textures for the object or objects affected by the events occurring in the scene. This phase is shown in FIG. 3 in more detail.

Trajectory calculation preferably starts with a test performed in step 141, where it is checked whether the relevant particle is active or deactivated. If it is deactivated, step 145 is performed in order to update the relevant particle data. In such cases, the data related to the particle comprises a parameter related to the deactivation of said particle. If the particle is active, a second test, at step 142, checks whether the particle collides with an object. If the test produces a negative result, step 145 is performed in order to update the relevant particle data. In case of collision, a trace generation phase 143 is performed. A trace modification phase 144 may then possibly be carried out in the case where one or more traces are affected by a new collision or trace. These phases are shown in detail in FIGS. 4 and 5.

Step 145 next ensures that the data affected by the preceding steps or phases are updated. This, in particular, is the case of the particle and/or trace data. The calculation phase ends at step 146.

Alternatively, the test at step 141 is followed by a test 147 to check whether the particle being processed generates or not a possible new particle or a new emitter. If this test is positive, step 148 is then performed to update the emitter data as a function of the particle generation mode. Otherwise, step 145 is performed in order to update the relevant particle data. Test 147 is also performed in the case where the collision test with an object from step 142 yields a positive result.

FIG. 3 shows in greater detail the most important steps of phase 150 which consists in integrating the physical parameters and generating and/or adapting textures resulting from events taking place in the scene. At step 151, physical parameter integrator 6 receives applicable trace data, object data and graphical effects data.

In step 152, the integrator implements the graphical effects which correspond to the received data, based on the object data and the relevant trace data, for example, flaking paint, corrosion (if metal), burn, combustion, trace interruption for porous materials, and non-absorbent sagging. Step 153 checks whether one or more other traces are taken into account. If this is the case, the trace mixer module 7 pools the trace parameters for those areas that are shared by several traces.

Any user data is taken into account in step 155. Finally, once all of the iterations have been performed, the physical parameters are integrated by integrator 6 in order to generate and/or modify the object's textures.

Figure 5:
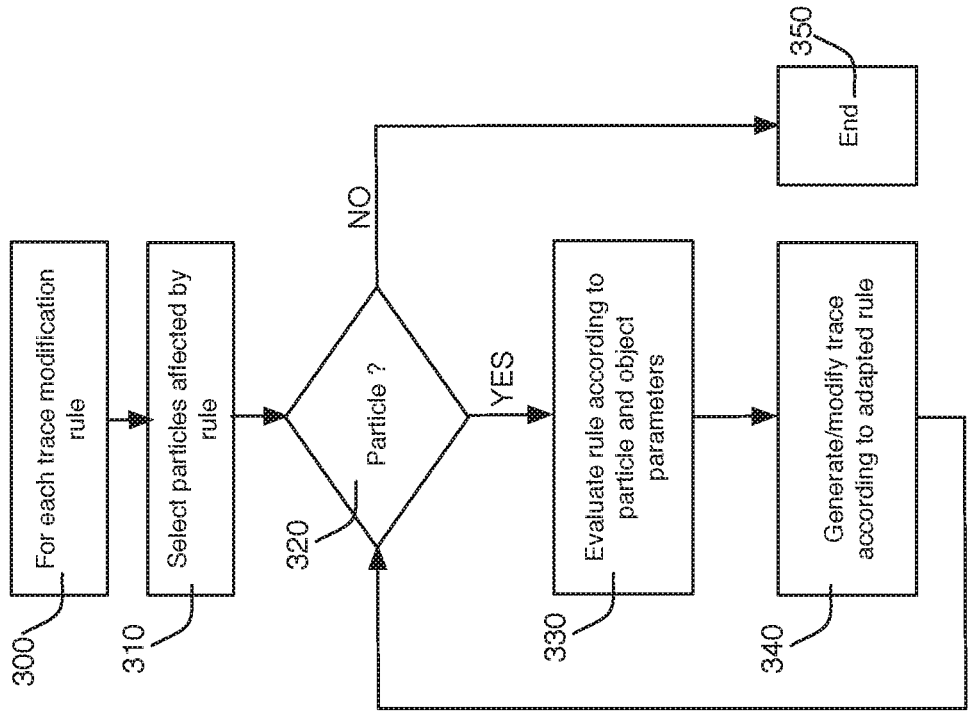
FIG. 5 is a block diagram showing in detail a second trace generation mode.
Figure 4:
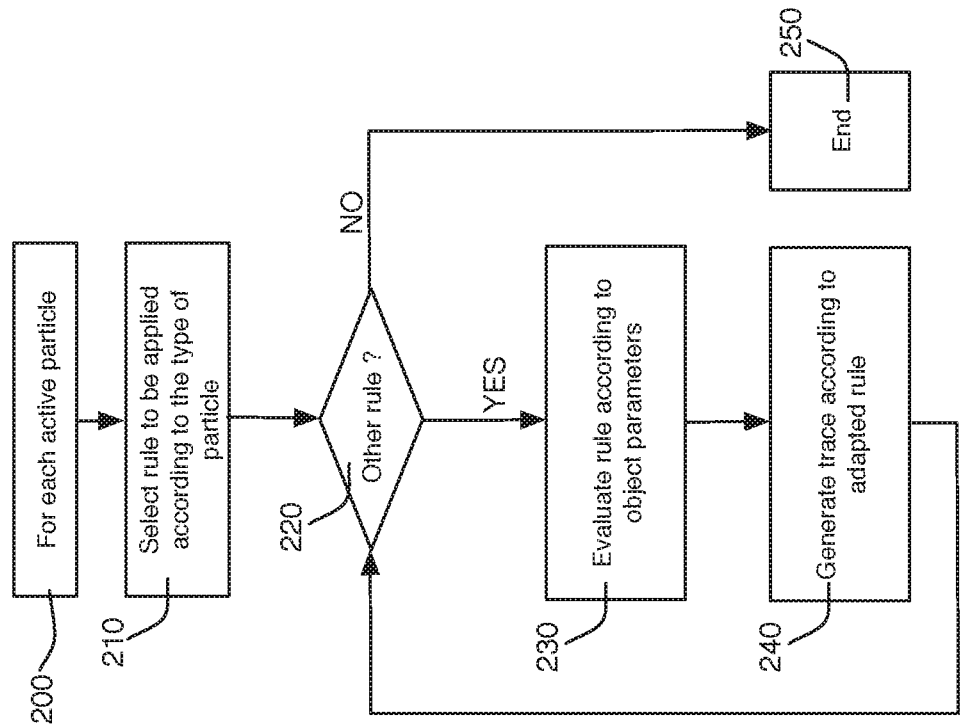
FIG. 4 is a block diagram showing in detail a first trace generation mode.

As previously mentioned, phase 143 is detailed in FIGS. 4 and 5, in steps 200 to 250 for the case of FIG. 4, and in steps 300 to 350 for the case of FIG. 5.

In FIG. 4, for each active particle (step 200), tracer module 5 selects a rule to be applied depending on the type of particle. The rules enable the determination of the type of influence or physical effect the relevant particle will have on the generated trace, and ultimately on the textures obtained for the object interacting with said particle. At step 230, the rule is evaluated according to the object parameters. At step 240, a trace is generated or changed according to the appropriate rule. A test at step 220 checks whether or not another rule applies.

In FIG. 5, for each trace modification rule (step 300), tracer module 5 selects particles affected by the rule. In step 330, the rule is evaluated based on the particle parameters and the object. In 340, a trace is generated or modified according to the appropriate rule. A test in step 320 checks whether or not another particle applies.

Alternatives And Other Embodiments

In the above, the system and method of the invention have been disclosed in a working environment suitable for an editing tool, for a user who intends to create or modify the rendition of one or more objects.

Alternatively, the system and method according to the invention are used in a standalone mode, for generating renditions of objects using physical parameters that are predetermined or may be calculated by the system itself, for example based on intermediate results. Such exemplary embodiments are advantageously used for video games or movies, in particular games or movies in which textures are rendered or generated by a procedural texture generation engine. Document WO2012014057, which is incorporated by reference herein, describes an example of such a rendering system and process.

The system and method according to the invention allow renditions of objects to be generated and/or modified, taking into account the technical (physical, chemical, thermodynamic, etc.) factors inherent to the objects themselves as well as the scene's environment.

For example, to create a corrosion effect on an object, an emitter may project particles parameterized with parameters that are related to corrosion. Among these physical parameters (other than color data) the behavior of objects with respect to the projected particles, that is to say, the interactions between the different physical items can for example be such that materials such as plastic do not react to corrosion effects, steel develops corroded areas, copper oxidizes, etc.

According to the embodiments, certain parameters can be assigned either to parameterized particles, or to objects, or to the environment, or else, to the graphical effects. The parametric distribution or architecture can also vary in order to produce comparable renditions.

In another exemplary use of the method and system according to the invention, the particles projected against the objects only have non-colorimetric parameters, such as thermal energy or heat data, pressure data, etc.

In one example where an emitter projects water, the target object with a plurality of different materials may have different reaction modes according to the materials on which the traces evolve. The traces may be different, and the graphical effects may also be different, so that the final textures take the parameters of the various materials of the target into account.

In another example, hot particles are emitted onto a multi-material body. The traces allow a kind of temperature "mapping" to be created on the surface of the object. This "mapping", to which the graphical effects are applied, makes it possible to produce final textures which take different materials into account.

Table 1 below illustrates examples of parameters and rules allowing the discussed examples to be implemented.

TABLE 1

| | | | | | | | |
|---|---|---|---|---|---|---|---|
| | | | | Example of physical parameters | | | |
| Particles | Emitter | Object | Environment | Particle trajectory calculation | Calculation of trace on object | Graphical effect to be applied | Adapted texture |
| Water | Water gun | Metal + Wood + PVC Body | Neutral | Trajectory data in space | Metal: sagging Wood: absorbs PVC: sagging | Metal: corrosion Wood and PVC: wetting effect | Object texture with applied effect |
| Burning gas | Torch | Metal + Wood + PVC Body | Neutral | Trajectory data in space | Mapping of tempature onto object | Metal: non effect PVC: melts Wood: burnt areas | Object texture with applied effect |
| Projectile | Gun | Spaceship | Neutral | Trajectory data in space | Points of impact on surface | Crater form on surface + ripples | Object texture with applied effect |

Temporal backup advantageously makes it possible to go back into a process in order to recover one of the multiple previous states. This also allows a process to be rerun by modifying only one or a few parameters, while advantageously keeping the other parameters unchanged, thus avoiding having to parameterize all of the data again. It is thus possible, for example, to easily and quickly compare results obtained by only modifying some of the parameters.

For example, it is possible to change a particle characteristic (e.g. color, size, la hardness, temperature, etc.) for one or more previously projected particles during the process.

The above-described figures are given by way of non-limiting example of the present invention.

The reference numerals in the claims have no limiting character. The words "comprise" and "include" do not exclude the presence of items other than those listed in the claims. The word "a" preceding an item does not exclude the presence of a plurality of such items. In addition, the above-described system and method advantageously operate in a multi-channel configuration, that is to say, by processing several textures (diffuse, normal, etc.) at each step.

What is claimed is:

1. A method comprising:
   determining particle parameters for virtual particles to be emitted;
   determining emitter parameters for a virtual particle emitter that emits the virtual particles;
   dynamically emitting, by the virtual particle emitter, the virtual particles onto a target object within a scene in accordance with movement of the virtual particle emitter within the scene based on user input;
   determining trajectories for the virtual particles along the target object as a function of the emitter parameters, the particle parameters, and the movement of the virtual particle emitter;
   generating, for virtual particle impacts with the target object, parameterized traces along one or more surfaces of the target object based on the determined trajectories;
   generating graphical effects along the one or more surfaces of the target object based on the parameterized traces;
   generating a set of procedural textures defined by algorithms for the target object, wherein the algorithms incorporate the graphical effects of one or more of a physical or chemical process that occurs due to parameterized traces of the virtual particles colliding with the target object; and
   integrating the set of procedural textures with the target object by utilizing a rendering engine to transform the algorithms of the set of procedural textures into an image incorporating the graphical effects.

2. The method of claim 1, wherein dynamically emitting, by the virtual particle emitter, the virtual particles onto the target object within the scene in accordance with movement of the virtual particle emitter within the scene based on user input comprises emitting the virtual particles from a brush as the brush is moved about the scene based on user input.

3. The method of claim 2, wherein generating the graphical effects along the one or more surfaces of the target object based on the parameterized traces comprises coloring the target object along the parameterized traces.

4. The method of claim 3, wherein generating the graphical effects along the one or more surfaces of the target object comprises mixing colors of two or more virtual particles when the two or more virtual particles collide.

5. The method of claim 2, further comprising:
   determining a material of the target object;
   determining an object rule based on the material of the target object; and
   generating the parameterized traces along one or more surfaces of the target object based on the determined trajectories and the object rule.

6. The method of claim 5, wherein:
   determining the material of the target object comprises determining that the target object comprises wood;
   determining the object rule based on the material of the target object comprises determining that the target object will absorb one or more virtual particles; and
   generating the parameterized traces along the one or more surfaces of the target object based on the determined trajectories and the object rule comprises ending a parameterized trace on the target object based on the one or more virtual particles being absorbed.

7. The method of claim 5, wherein:
determining the material of the target object comprises determining that the target object comprises plastic; and
determining the object rule based on the material of the target object comprises determining that one or more virtual particles will bead on the target object and not be absorbed.

8. The method of claim 1, wherein generating, for virtual particle impacts with the target object, the parameterized traces along one or more surfaces of the target object based on the determined trajectories comprises generating liquid traces that flow down the target object.

9. The method of claim 8, wherein utilizing the rendering engine to transform the algorithms of the set of procedural textures into the image comprising transforming the algorithms into a bitmap.

10. A system comprising:
one or more processors configured to cause the system to:
determine particle parameters for virtual particles to be emitted;
determine emitter parameters for a virtual particle emitter that emits the virtual particles;
dynamically emit, by the virtual particle emitter, the virtual particles onto a target object within a scene in accordance with movement of the virtual particle emitter within the scene based on user input;
determine trajectories for the virtual particles along the target object as a function of the emitter parameters, the particle parameters, and the movement of the virtual particle emitter;
generate, for virtual particle impacts with the target object, parameterized traces along one or more surfaces of the target object based on the determined trajectories;
generate graphical effects along the one or more surfaces of the target object based on parameterized traces;
generate a set of procedural textures defined by algorithms for the target object, wherein the algorithms incorporate the graphical effects of one or more of a physical or chemical process that occurs due to parameterized traces of the virtual particles colliding with the target object; and
integrate the set of procedural textures with the target object by utilizing a rendering engine to transform the algorithms of the set of procedural textures into an image incorporating the graphical effects.

11. The system of claim 10, wherein the one or more processors are further configured to cause the system to:
determine a first trajectory of a first particle at a first time period based on a first set of spatial coordinates of the virtual particle emitter;
wherein a first parameterized trace along the one or more surfaces of the target object at first location corresponds to the first trajectory of the first particle at the first time period.

12. The system of claim 11, wherein the one or more processors are further configured to cause the system to:
determine a second trajectory of a second particle at a second time period based on a second set of spatial coordinates of the virtual particle emitter;
wherein a second parameterized trace along the one or more surfaces of the target object at second location corresponds the second trajectory of the second particle at the second time period.

13. The system of claim 12, wherein the one or more processors are further configured to cause the system to:
determine that the first location and the second location overlap; and
generate a graphical effect on the target object based on the first and second parameterized traces by merging the first and second parameterized traces.

14. The system of claim 10, wherein utilizing the rendering engine to transform the algorithms of the set of procedural textures into the image comprising transforming the algorithms into a bitmap.

15. A non-transitory computer-readable medium storing instructions that, when executed by at least one processor, cause a computing device to:
determine particle parameters for virtual particles to be emitted;
determine emitter parameters for a virtual particle emitter that emits the virtual particles;
dynamically emit, by the virtual particle emitter, the virtual particles onto a target object within a scene in accordance with movement of the virtual particle emitter within the scene based on user input;
determine trajectories for the virtual particles along the target object as a function of the emitter parameters, the particle parameters, and the movement of the virtual particle emitter;
generate, for virtual particle impacts with the target object, parameterized traces along one or more surfaces of the target object based on the determined trajectories;
generate graphical effects along the one or more surfaces of the target object based on parameterized traces;
generate a set of procedural textures defined by algorithms for the target object, wherein the algorithms incorporate the graphical effects of one or more of a physical or chemical process that occurs due to parameterized traces of the virtual particles colliding with the target object; and
integrate the set of procedural textures with the target object by utilizing a rendering engine to transform the algorithms of the set of procedural textures into an image incorporating the graphical effects.

16. The non-transitory computer-readable medium of claim 15, further comprising instructions that, when executed by the at least one processor, cause the computing device to determine the particle parameters for virtual particles by receiving user input specifying one or more of a particle size, a particle deactivation parameter, or a particle color.

17. The non-transitory computer-readable medium of claim 15, further comprising instructions that, when executed by the at least one processor, cause the computing device to determine the emitter parameters for the virtual particle emitter based on a user selection of the virtual particle emitter from a plurality of virtual particle emitters.

18. The non-transitory computer-readable medium of claim 15, further comprising instructions that, when executed by the at least one processor, cause the computing device to determine whether to apply gravitational forces to the virtual particles based on the emitter parameters associated with the virtual particle emitter.

19. The non-transitory computer-readable medium of claim 15, wherein the virtual particle emitter comprises one of a brush or spray gun.

20. The non-transitory computer-readable medium of claim 15, utilizing the rendering engine to transform the algorithms of the set of procedural textures into the image comprising transforming the algorithms into a bitmap.

* * * * *